US008632237B2

(12) United States Patent
Chiang et al.

(10) Patent No.: US 8,632,237 B2
(45) Date of Patent: Jan. 21, 2014

(54) LIGHT GUIDE PLATE WITH ADJUSTABLE ILLUMINATION ANGLE, ILLUMINATION DEVICE WITH ADJUSTABLE ILLUMINATION ANGLE, AND METHOD FOR ADJUSTING ILLUMINATION ANGLE THEREOF

(75) Inventors: Chung-I Chiang, Yangmei (TW);
Chuan-Fa Lin, Yangmei (TW);
Ching-Huan Liao, Yangmei (TW)

(73) Assignee: Walsin Lihwa Corporation, Yangmei (TW)

( * ) Notice: Subject to any disclaimer, the term of this patent is extended or adjusted under 35 U.S.C. 154(b) by 0 days.

(21) Appl. No.: 13/563,101

(22) Filed: Jul. 31, 2012

(65) Prior Publication Data

US 2013/0027975 A1    Jan. 31, 2013

Related U.S. Application Data

(60) Provisional application No. 61/513,656, filed on Jul. 31, 2011.

(30) Foreign Application Priority Data

May 11, 2012    (TW) .............................. 101117003 A

(51) Int. Cl.
        *F21V 7/04*        (2006.01)
(52) U.S. Cl.
        USPC .......................................... 362/615; 362/629
(58) Field of Classification Search
        USPC ................................. 362/615–629
        See application file for complete search history.

(56) References Cited

U.S. PATENT DOCUMENTS

| 8,297,802 B2* | 10/2012 | Ye et al. ........................ 362/339 |
| 2007/0047259 A1* | 3/2007 | Lee et al. ...................... 362/615 |
| 2008/0266902 A1 | 10/2008 | Zheng | |
| 2010/0085771 A1 | 4/2010 | Lin | |
| 2011/0096566 A1 | 4/2011 | Tsai et al. | |

FOREIGN PATENT DOCUMENTS

| CN | 101295099 | 10/2008 |
| CN | 101469837 | 7/2009 |
| CN | 101769449 | 7/2010 |
| TW | 201115231 | 5/2011 |

OTHER PUBLICATIONS

Office Action from related Chinese Appln. No. 201210266524.6 dated Jul. 23, 2013. English translation attached.

* cited by examiner

*Primary Examiner* — Anne Hines
(74) *Attorney, Agent, or Firm* — Grossman, Tucker, Perreault & Pfleger, PLLC

(57) ABSTRACT

A light guide plate with an adjustable illumination angle and an illumination device using the same are provided. The light guide plate has a first surface and a second surface opposite to the first surface. The second surface further has a plurality of deformable microstructures thereon. The deformable microstructures will be deformed when an external force is applied to the deformable microstructures. The illumination device has a light source and a light guide plate that is disposed next to the light source. A light beam emitted from the light source enters into the light guide plate and leaves the light guide plate via reflecting or refracting by the deformable microstructures. By applying a different external force to the light guide plate, the deformation of the deformable microstructures will be varied. Therefore, the illumination angle of the light beam could be changed according to the deformation of the deformable microstructures.

19 Claims, 8 Drawing Sheets

LIGHT GUIDE PLATE WITH ADJUSTABLE ILLUMINATION ANGLE, ILLUMINATION DEVICE WITH ADJUSTABLE ILLUMINATION ANGLE, AND METHOD FOR ADJUSTING ILLUMINATION ANGLE THEREOF

This application claims priority to U.S. provisional application No. 61/513,656 filed on Jul. 31, 2011, and Taiwan Patent Application No. 101117003 filed on May 11, 2012, which are hereby incorporated herein by reference in their entirety.

CROSS-REFERENCES TO RELATED APPLICATIONS

Not applicable.

BACKGROUND OF THE INVENTION

1. Field of the Invention

The present invention relates to a light guide plate, an illumination device and a method for adjusting a light guide plate; and more particularly, the present invention relates to a light guide plate with an adjustable illumination angle, an illumination device with an adjustable illumination angle, and a method for adjusting the illumination angle of a light guide plate.

2. Descriptions of the Related Art

Conventional light guide plates usually are edge-type light guide plates in combination with light emitting diodes (LEDs). An illumination angle of such a light guide plate is unchangeable and is controlled by the microstructures on the light guide plate. In other words, a desired illumination angle must be determined in advance before the microstructures are formed, and the illumination angle is unchangeable. Therefore, different light guide plates must be used when different illumination angles are desired.

FIG. 1 illustrates a schematic view of an illumination device 100 disclosed in Taiwan Patent Application No. 098136506. The illumination device 100 comprises a light guide plate 110, a plurality of microstructures 118 disposed on the surface of the light guide plate 110, a light source 120 and a prism sheet 130. A light beam emitted from the light source 120 enters into the light guide plate 110. Then, by means of the microstructures 118 which disrupt the total reflection, a part of the light beam is reflected to leave the light guide plate 110 from the first surface 112 of the light guide plate 110; and the remaining part of the light beam leaves the light guide plate 110 from the second surface 114 of the light guide plate 110 and is reflected by a reflective plate 160 to enter into the light guide plate 110 again, and then leaves the light guide plate 110 from the first surface 112. Finally, an illumination angle of light left from the first surface 112 is adjusted by the prism sheet 130. For conventional illumination devices, the prism sheet and the microstructures must be custom designed according to specific requirements, which makes it difficult to adjust the illumination angle depending on the practical scenarios and requirements of practical use.

Accordingly, it is important to provide an illumination device that allows for the flexible adjustment of an illumination angle thereof in practical operations.

SUMMARY OF THE INVENTION

An objective of the present invention is to provide a light guide plate with adjustable illumination angle, which allows for the adjustment of the illumination angle thereof according to different requirements to achieve a desired luminance effect.

To achieve the aforesaid objective, an embodiment of the present invention provides a light guide plate with an adjustable illumination angle, which comprises a first surface and a second surface opposite to the first surface. The second surface comprises a plurality of deformable microstructures. The deformable microstructures are deformed when an external force is applied to the deformable microstructures.

Another embodiment of the present invention provides an illumination device with adjustable illumination angle, which comprises a light source and a light guide plate. The light source is used to provide a light beam. The light guide plate is disposed next to the light source. The light guide plate has a first surface and a second surface opposite to the first surface. The second surface comprises a plurality of deformable microstructures. The light beam emitted from the light source enters into the light guide plate and leaves the first surface of the light guide plate via reflecting or refracting by the deformable microstructures. A first illumination angle is included between the light beam and a normal line of the first surface when the light beam leaves the first surface of the light guide plate, and the first illumination angle changes into a second illumination angle when the deformable microstructures are deformed.

A further embodiment of the present invention provides a method for adjusting an illumination angle of a light guide plate. The light guide plate comprises a plurality of deformable microstructures. First, a light beam is provided to the light guide plate, and a first illumination angle is included between the light beam and a normal line of a surface of the light guide plate when the light beam leaves the light guide plate. Then, the deformable microstructures are deformed to change the first illumination angle into a second illumination angle.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
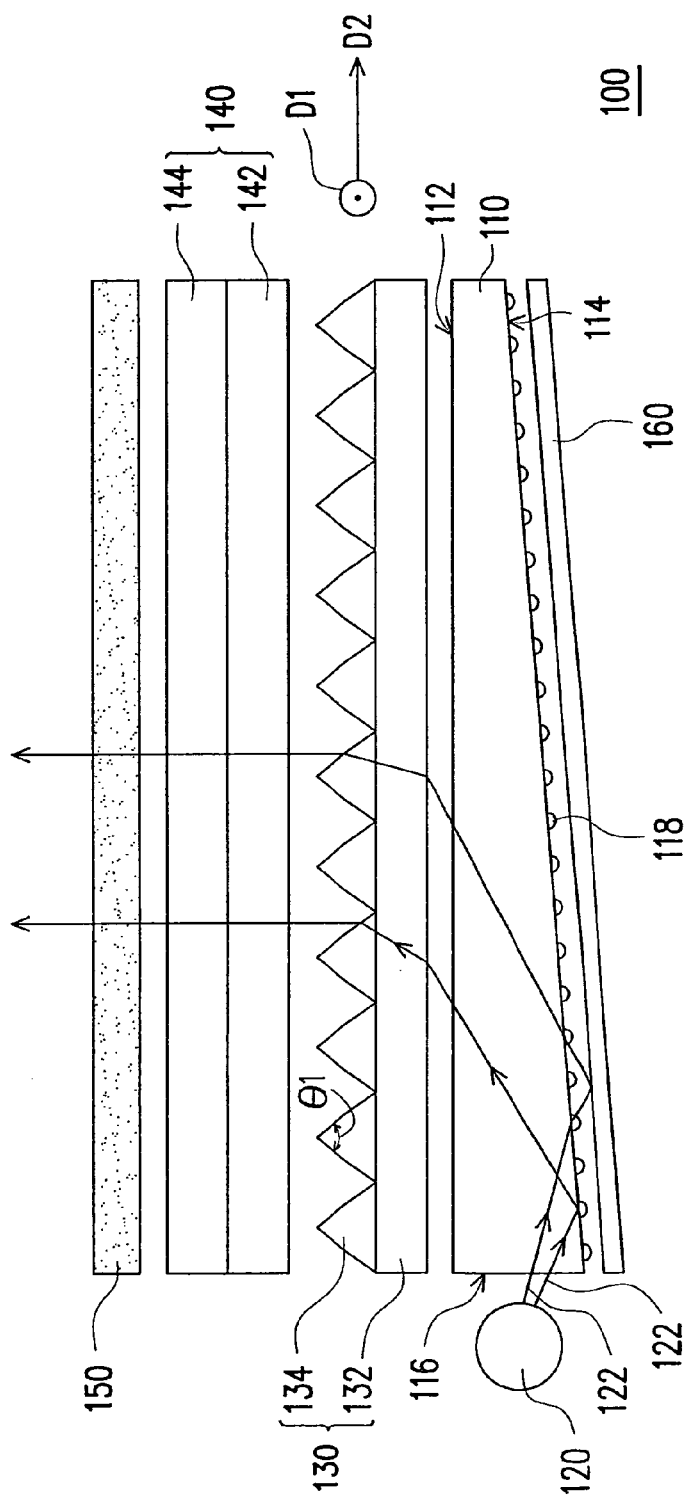
FIG. 1 is a schematic view of an illumination device disclosed in Taiwan Patent Application No. 098136506.
Figure 2:
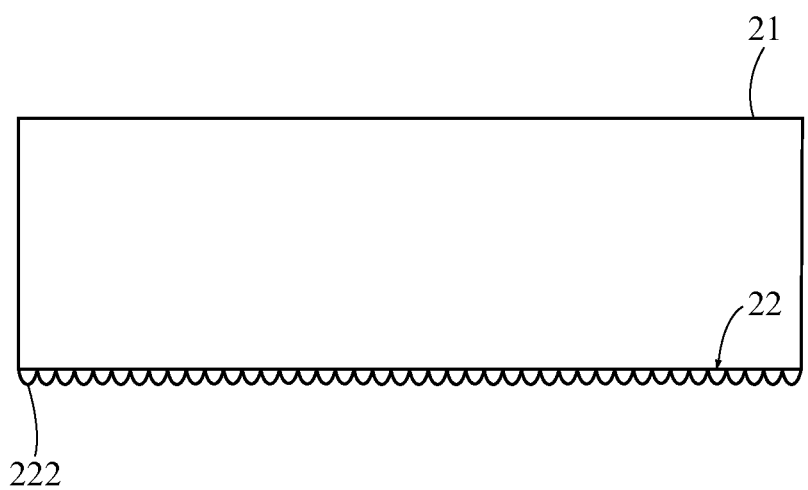
FIG. 2 is a schematic view of a light guide plate according to the present invention.
Figure 3:
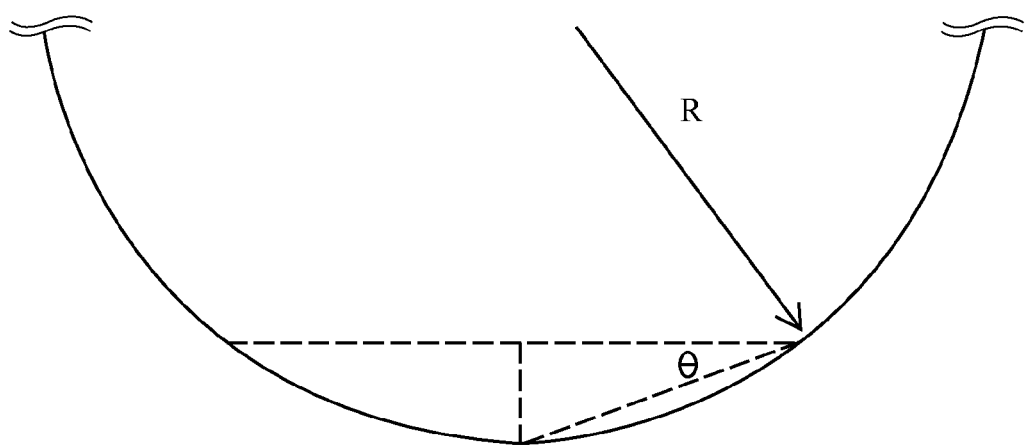
FIG. 3 is a partially enlarged view of deformable microstructures of FIG. 2.
Figure 4A:
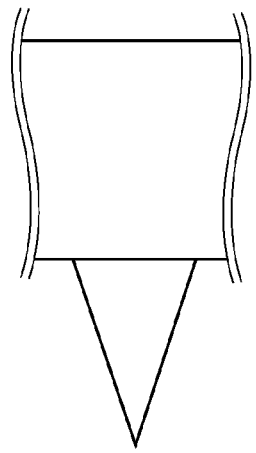
FIG. 4A is a schematic view of the deformable microstructures when no external force is applied thereon.
Figure 4B:
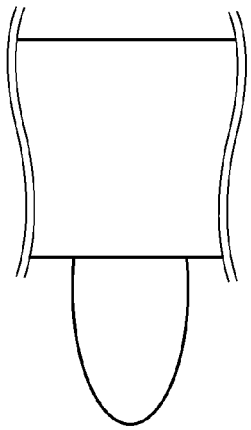
FIG. 4B is a schematic view of the deformable microstructures when an external force is applied thereon.
Figure 4C:
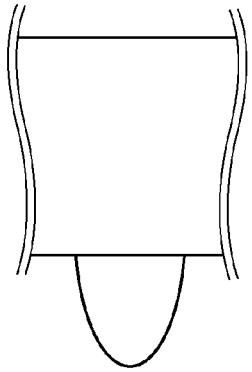
FIG. 4C is a schematic view of the deformable microstructures when another external force is applied thereon.
Figure 5:
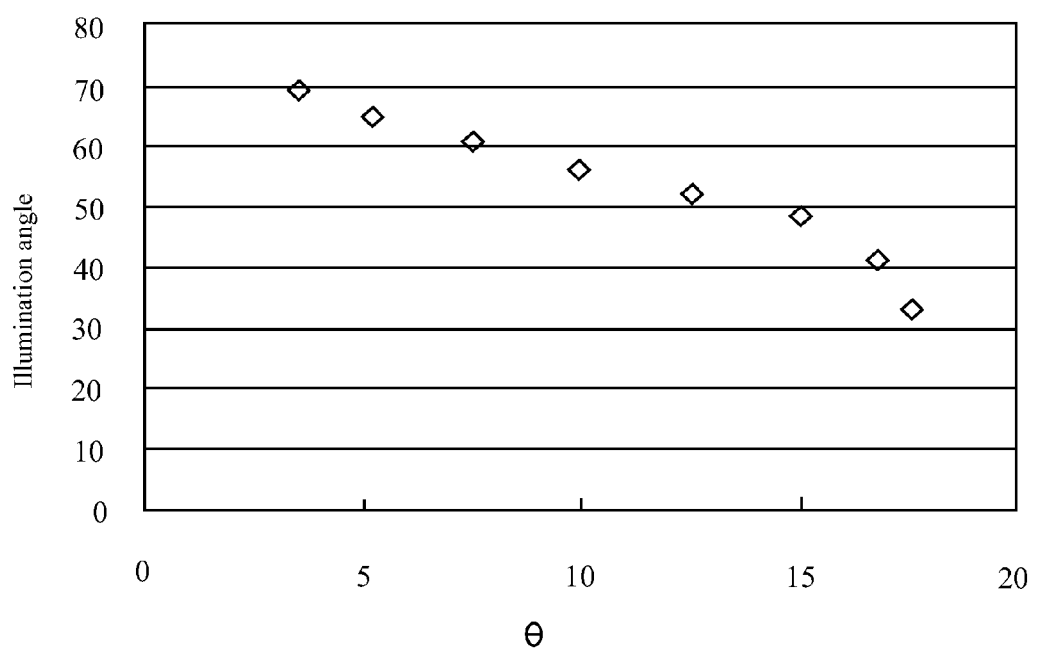
FIG. 5 is a schematic view illustrating variations of illumination angle as compared to the angle of deformable microstructures.

With reference to FIG. 2 to FIG. 5, FIG. 2 is a schematic view of a light guide plate 2 according to the present invention, while FIG. 3 is a partially enlarged view of deformable microstructures 222 of the light guide plate 2 of FIG. 2. FIG. 4A to FIG. 4C are schematic views illustrating the deformation of the deformable microstructures 222 under different external forces. FIG. 5 is a schematic view illustrating variations of illumination angle as compared to an angle θ of the deformable microstructures 222.

First, with reference to FIG. 2, the light guide plate 2 according to the present invention comprises a first surface 21 and a second surface 22 opposite to the first surface 21. The second surface 22 has a plurality of deformable microstructures 222. The deformable microstructures 222 are deformed when an external force is applied to the deformable microstructures 222.

The light guide plate 2 according to the present invention may be a common light guide plate or a flexible light guide plate. The light guide plate 2 may be made of polymethyl methacrylate (PMMA), silica gel, polycarbonate (PC), cyclo olefin polymer (COP), polystyrene (PS), or a combination thereof. The light guide plate 2 may be formed by injection molding, thermoforming, extrusion molding or laser machining.

The deformable microstructures 222 may be integrally formed with the light guide plate 2; that is, the deformable microstructures 222 may be formed on the light guide plate 2 directly through etching, laser machining or precision processing. For example, the deformable microstructures 222 may be formed into a mold; and then, in the process of forming the light guide plate 2, the deformable microstructures 222 could be transferred onto the second surface 22 of the light guide plate 2. Alternatively, the light guide plate 2 and the deformable microstructures 222 may also be formed separately, and then the deformable microstructures 222 could be mounted onto the light guide plate 2 through subsequent processing. For instance, after the light guide plate 2 is formed through extrusion molding, the deformable microstructures 222 are formed onto the second surface 22 of the light guide plate 2 through screen printing or ink jet printing.

The material of the deformable microstructures 222 and the light guide plate 2 are not limited to be the same. The deformable microstructures 222 may be transparent, translucent or opaque, and have a refractive index ranging from 1.4 to 1.7. Furthermore, addition to the aforesaid materials of the light guide plate 2, the deformable microstructures 222 may also be made of ultraviolet (UV) ink or infrared (IR) ink if the deformable microstructures 222 are formed onto the light guide plate 2 through printing.

Next in FIG. 3, a partially enlarged view of the deformable microstructures 222 of the light guide plate 2 of FIG. 2 is shown. Each of the deformable microstructures 222 has a radius R and an angle θ defined therein. When the deformable microstructures 222 are deformed according to an external force that is applied thereon, the angle θ also changes correspondingly. With reference to the deformable microstructure 222 shown in FIG. 4A, the deformable microstructure 222 maintains a pyramid form when no external force is applied thereon, but not limited thereto. In other embodiments, the deformable microstructure 222 may also be a cone, hemisphere, semi-ellipsoid form, or the like. As shown in FIG. 4B and FIG. 4C, when the applied external force increases, the angle θ will decrease correspondingly. The force applied in FIG. 4C is larger than that in FIG. 4B; that is, the angle θ in FIG. 4C is smaller than the angle θ in FIG. 4B.

FIG. 5 illustrates a schematic view of the variations of the illumination angle as compared to the angle θ of the deformable microstructures 222. As can be known from FIG. 5, when the angle θ increases, the illumination angle decreases correspondingly. In other words, the illumination angle can be controlled by adjusting the angle θ. The angle θ may range from 0° to 20° and the illumination angle varies from 70° to 30°, correspondingly.

Figure 6A:
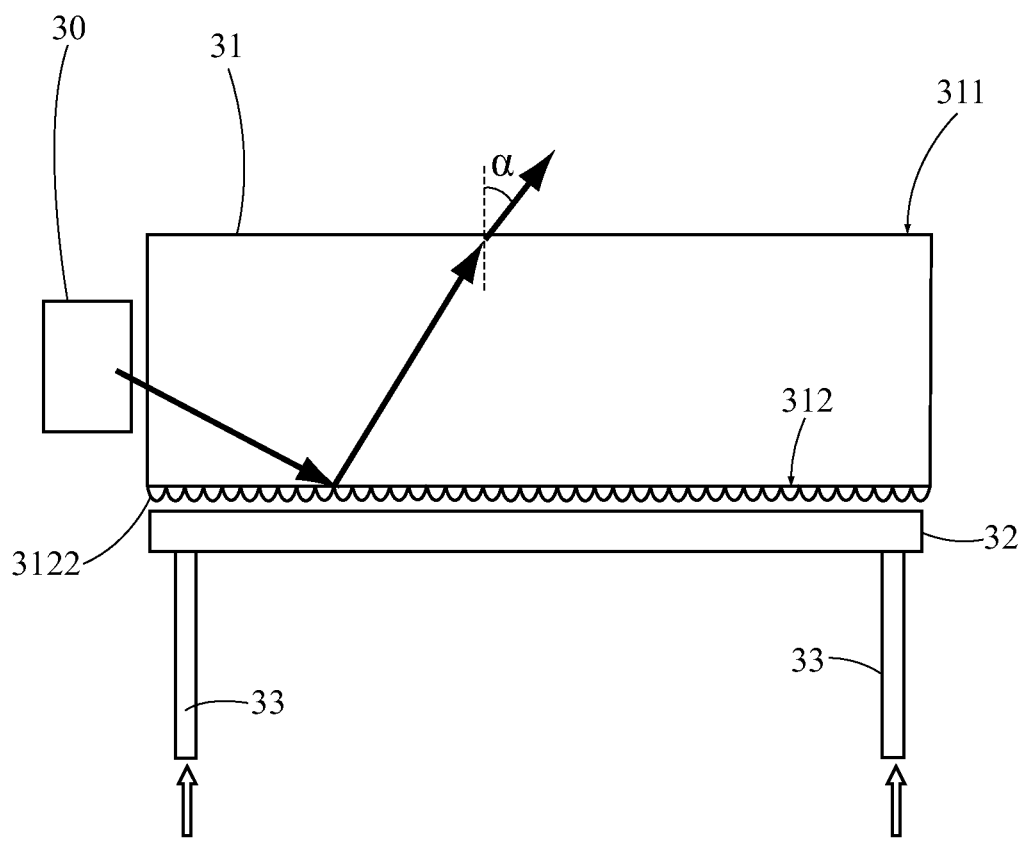
FIG. 6A is a schematic view illustrating an embodiment in which no force is applied to the deformable microstructures of an illumination device according to the present invention.
Figure 6B:
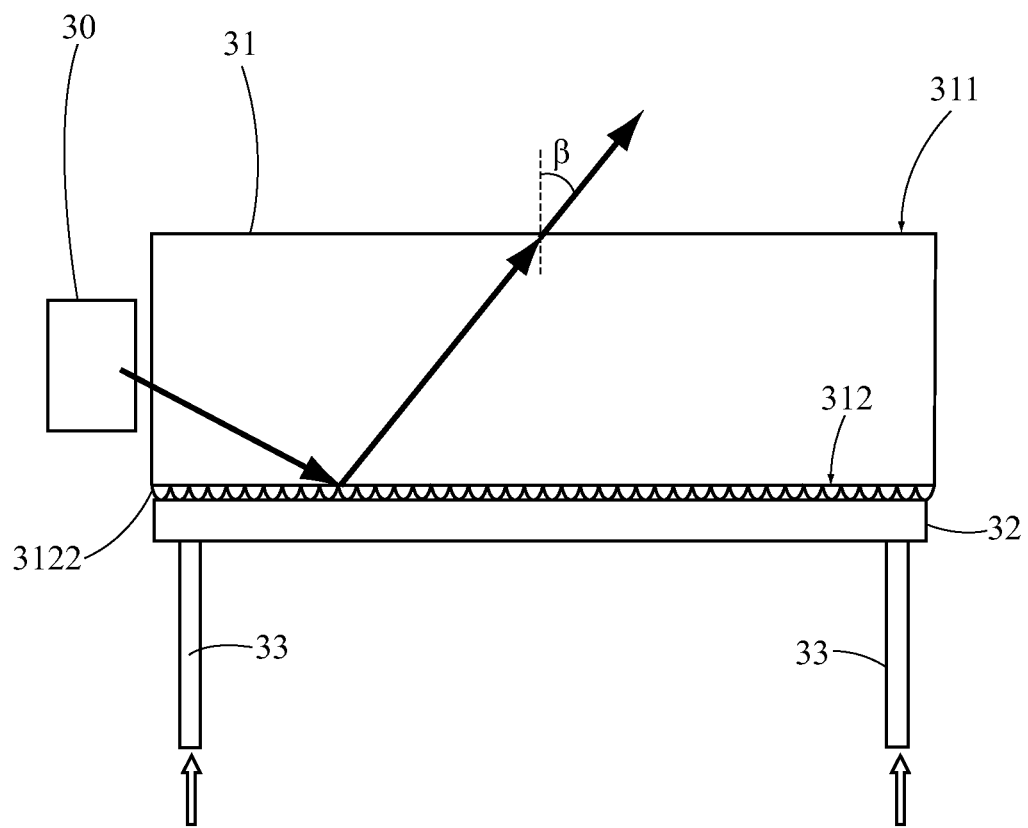
FIG. 6B is a schematic view illustrating the deformable microstructures of the illumination device of FIG. 6A after a force is applied thereon.

With reference to FIG. 6A and FIG. 6B, FIG. 6A is a schematic view illustrating an embodiment in which no force is applied to the deformable microstructures 3122 of an illumination device 3, while FIG. 6B is a schematic view illustrating the deformable microstructures 3122 of the illumination device 3 of FIG. 6A after a force is applied thereon.

In detail, the illumination device 3 comprises a light source 30, a light guide plate 31 and a reflective plate 32. The light guide plate 31 has a first surface 311 and a second surface 312 opposite to the first surface 311, while the second surface 312 has a plurality of deformable microstructures 3122. In this embodiment, the light source 30 is a side-type light source, and may be a light emitting diode (LED) or a laser diode adapted to provide a light beam, but not limited thereto. In other embodiments, the illumination device may comprise a plurality of light sources depending on the actual requirements. After the light beam enters into the light guide plate 31, portion of the light beam leaves the light guide plate 31 from the second surface 312 of the light guide plate 31. In order to further recycle and reuse the left light beam, the reflective plate 32 is disposed opposite to the second surface 312 of the light guide plate 31 to reflect the left light beam. In this way, the left light beam can be guided into the light guide plate 31 again and leaves the light guide plate 31 from the first surface 311.

With reference to FIG. 6A, while the light beam enters into the light guide plate 31, it is reflected or refracted by the deformable microstructures 3122, and leaves the light guide plate 31 from the first surface 311. An illumination angle is included between the light beam and a normal line (depicted by the dashed line) of the first surface 311 when the light beam leaves the first surface 311 of the light guide plate 31, and the angle is defined as a first illumination angle α. Furthermore, in this embodiment, the illumination device 3 further comprises a force-applying unit 33 for applying an external force (the direction of the force is shown by an arrow) through the reflective plate 32 to deform the deformable microstructures 3122. In other words, the reflective plate 32 is disposed between the second surface 312 of the light guide plate 31 and the force-applying unit 33. Addition to the use of recycling the left light beam, the reflective plate 32 may further be used to press against the deformable microstructures 3122 so as to deform the deformable microstructures 3122.

Next, with reference to FIG. 6B, after the force-applying unit 33 applies an external force to the reflective plate 32, the deformable microstructures 3122 are pressed to be deformed. When the applied force increases, the angle θ of each of the deformable microstructures 3122 decreases (see FIG. 5) so that the first illumination angle α is changed. In this case, the illumination angle between the left light beam and the normal line of the first surface 311 is defined as a second illumination angle β. In practice, the second illumination angle β is preferably greater than or equal to 30° and smaller than or equal to 70°. In other words, the first angle α would be changed into the second illumination angle β when the deformable microstructures 3122 are deformed.

It shall be particularly appreciated that the illumination angle of the light beam is defined as the first illumination angle α when no external force is applied to the deformable microstructures 3122 in this embodiment, but it does not mean that the first illumination angle α always represents a case in which no external force is applied. This embodiment is only intended to clarify and explain that the illumination angle of the light beam leaving from the light guide plate 31 will change correspondingly when the external force applied to the deformable microstructures 3122 changes. For example, in other embodiments, when a first external force is applied directly or indirectly to the deformable microstructures 3122, the illumination angle of the light beam leaving from the light guide plate 31 is defined as the first illumination angle α; and when the first external force applied to the deformable microstructures 3122 is increased or decreased to be a second external force, the illumination angle of the light beam leaving from the light guide plate 31 is changed into the second illumination angle β correspondingly.

The force-applying unit 33 may be composed of two push-pull rods or other equivalent structures and, as needed, may apply a uniform external force (e.g., the two push-pull rods apply the same force simultaneously) or different external forces respectively (e.g., the left push-pull rod applies a larger force) to the reflective plate 32 so that the reflective plate 32 presses against the deformable microstructures 3122 and thus, deforms the deformable microstructures 3122 to change the illumination angle.

However, in other embodiments, a temperature controlling unit (not shown) may be used to replace the force-applying unit 33 of this embodiment. The deformable microstructures are deformed through the heat expansion and cold contraction principle by using the temperature controlling unit to increase or decrease the temperature of the deformable microstructures, and this can also achieve an effect similar to that of the aforesaid embodiment. Furthermore, in addition to the use of applying a force to the second surface of the light guide plate via the reflective plate in the front direction, the force-applying unit may also be disposed at the left side or right side of a flexible light guide plate. By pulling or pressing the light guide plate leftwards or rightwards, the light guide plate may be deformed so that the deformable microstructures may also be deformed to change the illumination angle.

It shall be appreciated that the term "deform" used herein is not intended to indicate that the deformable microstructures must be deformed equally or by the same magnitude or in the same direction. In addition, the present invention only needs at least one of, a part of or all of the deformable microstructures to be deformed so that the light beam may be reflected or refracted by the deformable microstructures when the light beam enters into the light guide plate, and the illumination angle of the light beam could be changed thereby.

Figure 7:
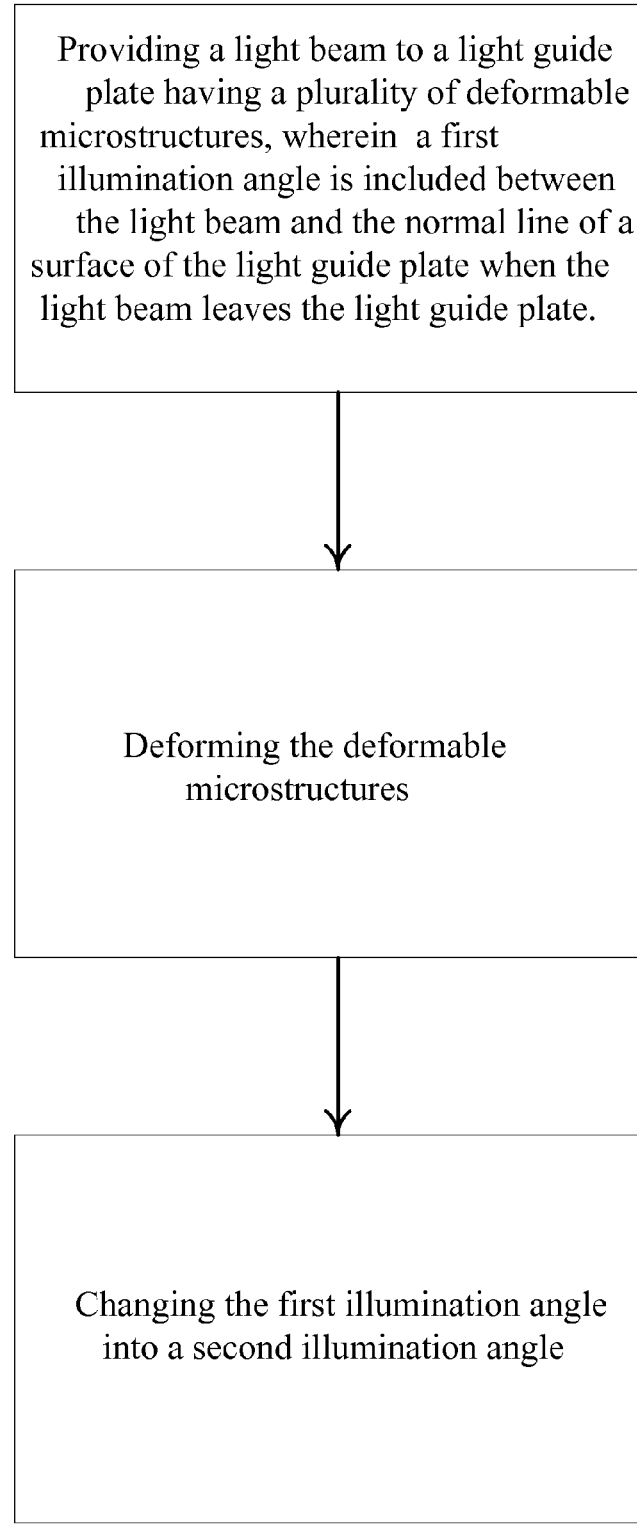
FIG. 7 is a flowchart diagram of a method for adjusting an illumination angle of a light guide plate according to the present invention.

FIG. 7 illustrates a flowchart diagram of a method for adjusting an illumination angle of a light guide plate according to the present invention. The light guide plate comprises a plurality of deformable microstructures. First, a light beam is provided to the light guide plate, and a first illumination angle is included between the light beam and a normal line of a surface of the light guide plate when the light beam leaves the light guide plate. Then, the deformable microstructures are deformed to change the first illumination angle into a second illumination angle.

In detail, according to the method of the present invention, the deformable microstructures may be deformed by using a force-applying unit to apply an external force via a reflective plate to the deformable microstructures, and the illumination angle of the left light beam could be changed thereby. However, the present invention is not limited thereto, and according to another embodiment of the present invention, the deformable microstructures may also be deformed by using a temperature controlling unit to increase or decrease the temperature of the deformable microstructures, and the effect of changing the illumination angle could be achieved thereby.

The light guide plate, the reflective plate, the force-applying unit, the temperature controlling unit and other components used in the method according to the present invention are just the same as those described in the aforesaid embodiment, and thus, will not be further described herein.

According to the above descriptions, the present invention provides a light guide plate with a plurality of deformable microstructures that could control and change the illumination angle of a light beam which leaves the light guide plate by adjusting the deformation level of the deformable microstructures. With this arrangement, the illumination angle of the light beam could be changed at any time according to the user's requirements in different situations to achieve a desired illumination effect.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A light guide plate with adjustable illumination angle, comprising:
   a first surface; and
   a second surface opposite to the first surface, the second surface comprising a plurality of deformable microstructures;
   wherein the deformable microstructures are deformed when an external force is applied to the deformable microstructures.

2. The light guide plate as claimed in claim 1, wherein the light guide plate is integrally formed with the deformable microstructures.

3. The light guide plate as claimed in claim 1, wherein the refractive index of the deformable microstructures ranges from 1.4 to 1.7.

4. The light guide plate as claimed in claim 1, wherein the deformable microstructures are formed by thermoforming, extrusion molding, injection molding, screen printing, or ink jet printing.

5. The light guide plate as claimed in claim 1, wherein the light guide plate is made of polymethyl methacrylate (PMMA), silica gel, polycarbonate (PC), cyclo olefin polymer (COP), polystyrene (PS), or a combination thereof.

6. The light guide plate as claimed in claim 1, wherein the deformable microstructures are made of polymethyl methacrylate (PMMA), silica gel, polycarbonate (PC), cyclo olefin polymer (COP), polystyrene (PS), ultraviolet (UV) ink, infrared (IR) ink, or a combination thereof.

7. An illumination device with adjustable illumination angle, comprising:
   a light source, providing a light beam; and
   a light guide plate, being disposed next to the light source, the light guide plate having a first surface and a second surface opposite to the first surface, and the second surface comprising a plurality of deformable microstructures, wherein the light beam enters into the light guide plate and leaves the first surface of the light guide plate via reflecting or refracting by the deformable microstructures;

wherein a first illumination angle is included between the light beam and a normal line of the first surface when the light beam leaves the light guide plate, and the first illumination angle changes into a second illumination angle when the deformable microstructures are deformed.

8. The illumination device as claimed in claim 7, further comprising a reflective plate and a force-applying unit, and the reflective plate being disposed between the second surface of the light guide plate and the force-applying unit, wherein the deformable microstructures are deformed by using the force-applying unit to apply an external force through the reflective plate to the deformable microstructures.

9. The illumination device as claimed in claim 7, further comprising a temperature controlling unit, wherein the deformable microstructures are deformed by using the temperature controlling unit to increase or decrease the temperature of the deformable microstructures.

10. The illumination device as claimed in claim 7, wherein the light guide plate is integrally formed with the deformable microstructures.

11. The illumination device as claimed in claim 7, wherein the second illumination angle is greater than or equal to 30° and smaller than or equal to 70°.

12. The illumination device as claimed in claim 7, wherein the refractive index of the deformable microstructures ranges from 1.4 to 1.7.

13. The illumination device as claimed in claim 7, wherein the deformable microstructures are formed by thermoforming, extrusion molding, injection molding, screen printing, or ink jet printing.

14. The illumination device as claimed in claim 7, wherein the light guide plate is made of polymethyl methacrylate (PMMA), silica gel, polycarbonate (PC), cyclo olefin polymer (COP), polystyrene (PS), or a combination thereof.

15. The illumination device as claimed in claim 7, wherein the deformable microstructures are made of polymethyl methacrylate (PMMA), silica gel, polycarbonate (PC), cyclo olefin polymer (COP), polystyrene (PS), ultraviolet (UV) ink, infrared (IR) ink, or a combination thereof.

16. The illumination device as claimed in claim 7, wherein the light source is a light emitting diode (LED) or a laser diode.

17. A method for adjusting an illumination angle of a light guide plate, the light guide plate comprising a plurality of deformable microstructures, the method comprising:

providing a light beam to the light guide plate, wherein a first illumination angle is included between the light beam and a normal line of a surface of the light guide plate when the light beam leaves the light guide plate; and deforming the deformable microstructures to change the first illumination angle into a second illumination angle.

18. The method as claimed in claim 17, wherein the step of deforming the deformable microstructures to change the first illumination angle into a second illumination angle is accomplished by using a force-applying unit to apply an external force through a reflective plate to the deformable microstructures of the light guide plate.

19. The method as claimed in claim 17, wherein the step of deforming the deformable microstructures to change the first illumination angle into a second illumination angle is accomplished by using a temperature controlling unit to increase or decrease the temperature of the deformable microstructures to deform the deformable microstructures.

* * * * *